(12) United States Patent
Maskarinec et al.

(10) Patent No.: US 7,824,523 B2
(45) Date of Patent: Nov. 2, 2010

(54) CATALYTICALLY ACTIVATED VACUUM DISTILLATION SYSTEM

(75) Inventors: Michael P Maskarinec, Knoxville, TN (US); Bart M. Taylor, Mobile, AL (US)

(73) Assignee: Earthfirst Technologies, Inc., Tampa, FL (US)

( * ) Notice: Subject to any disclaimer, the term of this patent is extended or adjusted under 35 U.S.C. 154(b) by 1201 days.

(21) Appl. No.: 11/405,799

(22) Filed: Apr. 17, 2006

(65) Prior Publication Data

US 2006/0289287 A1    Dec. 28, 2006

Related U.S. Application Data

(60) Provisional application No. 60/681,701, filed on May 17, 2005.

(51) Int. Cl.
| | |
|---|---|
| *C10B 53/00* | (2006.01) |
| *C10B 53/07* | (2006.01) |
| *C10B 47/20* | (2006.01) |
| *C10B 47/32* | (2006.01) |
| *C09C 1/48* | (2006.01) |

(52) U.S. Cl. ............................. 201/32; 201/33; 201/35; 201/18; 201/21; 201/25; 423/449.6; 423/449.8

(58) Field of Classification Search ...................... None
See application file for complete search history.

(56) References Cited

U.S. PATENT DOCUMENTS

| | | | |
|---|---|---|---|
| 5,414,169 | A | 5/1995 | Takahashi et al. |
| 5,744,668 | A | 4/1998 | Zhou et al. |
| 6,210,562 | B1 | 4/2001 | Xie |
| 6,270,630 | B1 | 8/2001 | Xing |
| 6,653,517 | B2 | 11/2003 | Bullock |
| 6,833,485 | B2 | 12/2004 | Nichols et al. |
| 6,835,861 | B2 | 12/2004 | Nichols et al. |

FOREIGN PATENT DOCUMENTS

EP                992567 A2 *    4/2000

* cited by examiner

*Primary Examiner*—Jennifer A Leung
(74) *Attorney, Agent, or Firm*—Robert L. McKellar; McKellar IP Law, PLLC

(57) ABSTRACT

A catalytically activated vacuum distillation system, several novel component parts of said system, a process for producing carbon based products and novel carbon black that is produced from such a system and process.

11 Claims, 5 Drawing Sheets

CATALYTICALLY ACTIVATED VACUUM DISTILLATION SYSTEM

This application claims priority from U.S. Provisional Utility Application No. 60/681,701, filed on May 17, 2005.

The invention disclosed and claimed herein deals with a catalytically activated vacuum distillation system, several novel component parts of said system, a process for producing carbon based products and novel carbon black that is produced from such a system and process.

BACKGROUND OF THE INVENTION

The published art is replete with examples of converting waste materials into useful hydrocarbon gases, liquids, and other carbon containing products. Early attempts at converting such materials to useful hydrocarbon gases, liquids and other carbon containing products included straight pyrolysis of such wastes.

Later studies led to the use of catalysts to enhance the breakdown of the waste materials. These thermal and/or catalytic assisted thermal cracking techniques were carried out under high temperatures and/or pressures, often entailing the use of temperatures in excess of 1500° F. and pressures in excess of 2,000 psi during the process. These conditions necessitated heavy equipment, and sometimes specialized equipment, to deal with the high temperatures and high pressures.

One such process can be found in U.S. Pat. No. 5,414,169, that issued to Takahashi, et al. on May 9, 1995 wherein there is disclosed a method of obtaining hydrocarbon oil from waste plastic material or waste rubber material, comprising the steps of subjecting the waste plastic material or a waste rubber material to thermal cracking so as to obtain a thermally cracked product, then liquefying the thermally cracked product into a liquefied product, and then causing a liquid phase cracking reaction of the liquefied product under the action of a catalyst on the liquefied product so as to produce a cracked product, and then cooling the cracked product so as to obtain the hydrocarbon oil.

U.S. Pat. No. 5,744,668, that issued on Apr. 28, 1998 to Zhou, et al., deals with a process of producing gasoline, diesel and carbon black with waste rubber and/or waste plastics. The process comprises pyrolysis, purifying, catalytic cracking and fractionation, similar to the '169 patent.

U.S. Pat. No. 6,270,630 that issued on Aug. 7, 2001 to Xing deals with a process and apparatus for producing hydrocarbons from residential trash or waste and/or organic waste materials, and deals primarily with the apparatus that is used for such process. The process requires that the organic waste materials are treated by a two-step cracking process, at different temperatures, with successive feeding and discharging.

There is disclosed in U.S. Pat. No. 6,653,517, that issued on Nov. 25, 2003 to Bullock, a method and apparatus for converting both organic and inorganic materials into more desirable products by the breaking down of these materials into their stable molecular constituents and reforming them into more desirable substances. The process involves the use of two chambers. Blended solid and fluid wastes are augured into the first chamber and agitated, preferably by rotating the chamber so that the waste tumbles over internal fins, while a heat gradient is applied. The process is catalyzed and the patentees use other means of enhancing the process.

U.S. Pat. No. 6,833,486, that issued on Dec. 21, 2004 to Nichols, et al, deals with a low energy method of pyrolysis of hydrocarbon materials such as rubber. In the process, the hydrocarbon material is heated while maintaining a vacuum using a clay catalyst. However, the catalyst is added to the feedstock of the process and is not put into the heated reactor prior to the introduction of the feedstock to the reactor as in the present invention.

A similar process can be found in U.S. Pat. No. 6,835,861, that issued Dec. 28, 2004 to Nichols, et al. in which the hydrocarbon materials is heated while maintaining a vacuum using a clay catalyst. This patent is a companion patent to the '486 patent. As in the '486 patent, the process requires that the hydrocarbon material and the catalyst be combined prior to feeding into the reaction chamber, and in column 4, line 65, to column 5, line 3, it is explained that the hydrocarbon material is added to the reactor first, then the clay catalyst, and the mixture is heated under vacuum conditions. In addition, at column 5, lines 28 to 30, it is disclosed that adding metals can be catalyzing certain reactions a augments the process.

A second patent to Bullock is U.S. Pat. No. 6,653,517, that issued on Nov. 25, 2003 that deals with a hydrocarbon conversion apparatus and method. The apparatus includes a pair of retort vessels in communication with each other, one of which has two chambers, one chamber containing a fluidized bed of catalytic feed and abrasive materials and the other a crusher mill. The vessels include lifting and stirring elements fixed to the interior walls to promote and help maintain a condition of fluidization of bed materials during operation. This process operates at negative pressure.

Finally, the patentees are aware of U.S. Pat. No. 6,210,562, that issued on Apr. 3, 2001 to Xie, et al that deals with a process for production of ethylene and propylene by catalytic pyrolysis of heavy hydrocarbons. A pillared interlayered clay molecular sieve and/or phosphorous and aluminum or magnesium or calcium modified high silica zeolites are used as catalysts.

THE INVENTION

The invention disclosed and claimed herein deals with a catalytically activated vacuum distillation system, several novel component parts of said system, a process for producing carbon based products and novel carbon black that is produced from such a system and process.

The catalytically activated vacuum distillation system comprises in combination (I) a feed hopper, wherein the feed hopper is capable of containing water in it. There is a feed conveyor, the feed conveyor comprising a first elongated hollow housing having a top side and contained therein, a rotatable screw feeding mechanism for essentially the length of the first elongated hollow housing. The top side of the first elongated hollow housing has an elongated opening for essentially the length of the first elongated hollow housing. The elongated opening is surmounted by a vaulted, sealed covering. There is a power and drive means for the rotatable screw in and a first fill chamber surmounting a first control value. There is a second fill chamber located beneath the first control valve, and a second control valve surmounting the second fill chamber.

There is a metering means. The metering means is comprised of a second elongated hollow housing having a top side. The second elongated hollow housing contains therein a metering screw for essentially the length of the second elongated hollow housing. The top of the second elongated hollow housing has an elongated opening for essentially the length of the second elongated hollow housing, the elongated opening is also surmounted by a vaulted, sealed covering, and there is a power and drive means for the metering screw of.

There is a reactor, the reactor comprises a third elongated hollow tube. The third elongated hollow tube has a near end and a distal end and a top side and is capped at the near end. The third elongated hollow tube has a feed screw located in it for essentially the length of the third elongated hollow tube, and the third elongated hollow tube has surmounted on it, a catalyst feed vessel, on the top side, near the near end. The catalyst feed vessel has an upper valve and a lower valve and there is a power and drive means for the feed screw of the reactor.

The system has a solids collection means located at the distal end of the third elongated hollow tube and a gas and liquid collection means located at the distal end of the reactor.

Finally, the system has a means of providing a negative pressure to the second fill chamber, the metering means, the catalyst feeding vessel, and the reactor and a means of heating the second fill chamber, the metering means, the catalyst feeding vessel, and the reactor.

In another embodiment of this invention, there is a process for obtaining carbon-based products from hydrocarbons, using the system described just Supra, the process comprising providing a feed hopper, a feed conveyor having an elongated hollow housing having an elongated opening therein that is surmounted by a vaulted, sealed covering, a first fill chamber with a first control valve in an open position, a second fill chamber, a second control valve in a closed position, a metering means having an elongated hollow housing having an elongated opening therein that is surmounted by a vaulted, sealed covering, a reactor comprising an elongated hollow housing having an elongated opening therein that is surmounted by a vaulted, sealed covering and an entry port and an exit port, a catalyst feed vessel having a first control valve in an open position and a second control valve in a closed position, a solids collection means, a gas and liquid collection means, a means of providing a negative pressure for the second fill chamber, metering means, catalyst feeding vessel, and reactor; a means of heating the second fill chamber, the metering means, the catalyst feeding vessel, and the reactor, and feeding a predetermined amount of hydrocarbons into the feed hopper.

A negative pressure is provided on the second fill chamber, the metering means, the catalyst feed vessel and the reactor and a predetermined amount of hydrocarbons are fed into the first fill chamber and the first control valve is closed.

The second control valve is opened and allows the contents of the first fill chamber to enter into the second fill chamber and the second control valve is then closed.

The reactor is then heated and the lower control valve of the catalyst fill vessel is closed, and the upper control valve of the catalyst fill vessel is opened, and a predetermined amount of catalyst is introduced into the catalyst fill vessel and the upper control valve is closed.

Thereafter, the lower control valve of the catalyst fill vessel is opened and the catalyst is allowed to enter the heated reactor. The contents of the second fill chamber are metered into the entry port of the reactor and the contents allowed to move through the reactor at a predetermined rate by the use of the rotatable screw, wherein the hydrocarbons react under the influence of the catalyst and provide volatile and solid carbon-based products.

The solid carbon-based products are allowed to separate and move from the volatile carbon-based products by gravity, to the solids collection means through the exit port of the reactor, and the volatile carbon-based products are allowed to move to the gas and liquid collection means through the exit port of the reactor.

Yet another embodiment of this invention are the novel components of the system, for example, the reactor. The reactor comprises an elongated hollow tube having a near end and a distal end that is capped at the near end. The elongated hollow tube contains a rotatable screw having a length essentially equal to the length of the elongated hollow tube. The elongated hollow tube has an opening through the top surface the opening having a length essentially equal to the length of the elongated hollow tube and the opening is covered and sealed by a vaulted cover.

The elongated hollow tube has a loading port near the near end, and an unloading port near the distal end. The elongated hollow tube has surmounted near the near end, a catalyst fill vessel, the vessel having an upper and a lower valve.

The elongated hollow tube has a means for heating the elongated hollow tube for essentially the entire length of it and the elongated hollow tube has the capability of holding a negative pressure.

Another embodiment consisting of novel components is the conveyor. The conveyor comprises an elongated hollow tube having a near end and a distal end and a top surface. The conveyor contains a rotatable screw in it having a length essentially equal to the length of the conveyor and the elongated hollow tube has an opening through the top surface, the opening having a length essentially equal to the length of the elongated hollow tube. The opening is covered and sealed by a vaulted cover.

Another embodiment of this invention is a novel carbon black that is produced by the process of this invention.

DETAILED DESCRIPTION OF THE INVENTION

Figure 1:
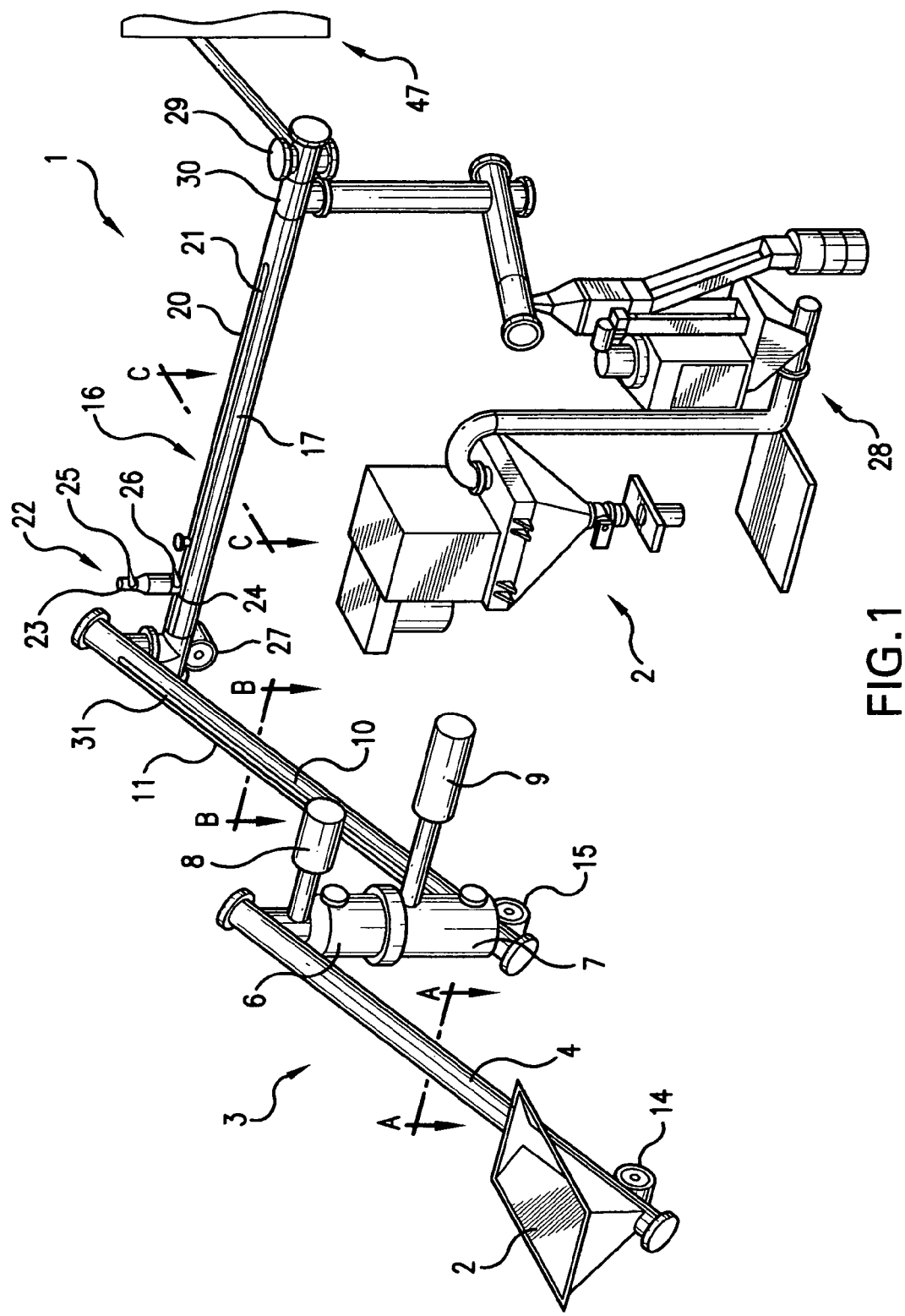
FIG. 1 is a non-scale view in perspective of the system of this invention.
Figure 2:
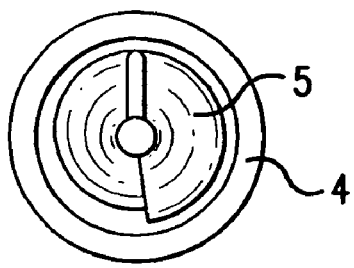
FIG. 2 is a cross sectional end view of the fee conveyor through line A-A of FIG. 1.
Figure 3:
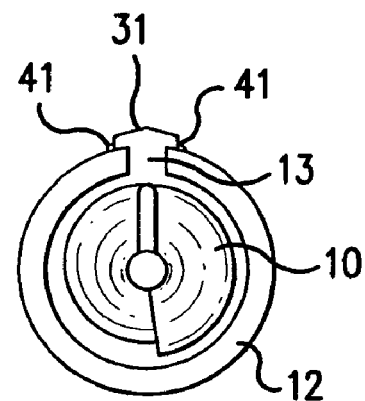
FIG. 3 is a cross sectional end view of the metering means through line B-B of FIG. 1.

Turning now to FIG. 1, which is a non-scale view of a large portion of the system of this invention, there shown a feed hopper 2, a feed conveyor 3, consisting of an elongated tube 4 containing a rotatable screw 5 (FIG. 2), a first fill chamber 6, a second fill chamber 7, a first control valve 8, a second control valve 9, a metering means that consists of an elongated hollow housing 10, a top side 11 of the elongated hollow housing 10, a rotatable screw 12 (FIG. 3) and an elongated opening 13 (FIG. 3), a vaulted, sealed covering 31 over the elongated opening 13, a power and drive means 14 for the rotatable screw 5 of the feed conveyor 3, a power and drive means 15 for the rotatable screw 12, a reactor 16 comprised of an elongated hollow housing 17, containing a rotatable screw 18 (FIG. 4), an elongated opening 19 (FIG. 4) in the top side 20 of the elongated hollow housing 17, a vaulted, sealed covering 21 (FIG. 4) along the elongated hollow housing 17 and covering the elongated opening 19, a catalyst feed vessel 22, having a near end 23 and a distal end 24, and having an upper valve 25 and a lower valve 26, a power an drive means 27 for the rotatable screw 18 for the reactor 16, a solids collection means 28, located at the distal end 30 of the elongated hollow housing 17, a gas and liquid collection means 29 located at the distal end 30 of the elongated hollow housing 17, the details of the collection means 28 and 29 being set forth below in detail infra.

Figure 5:
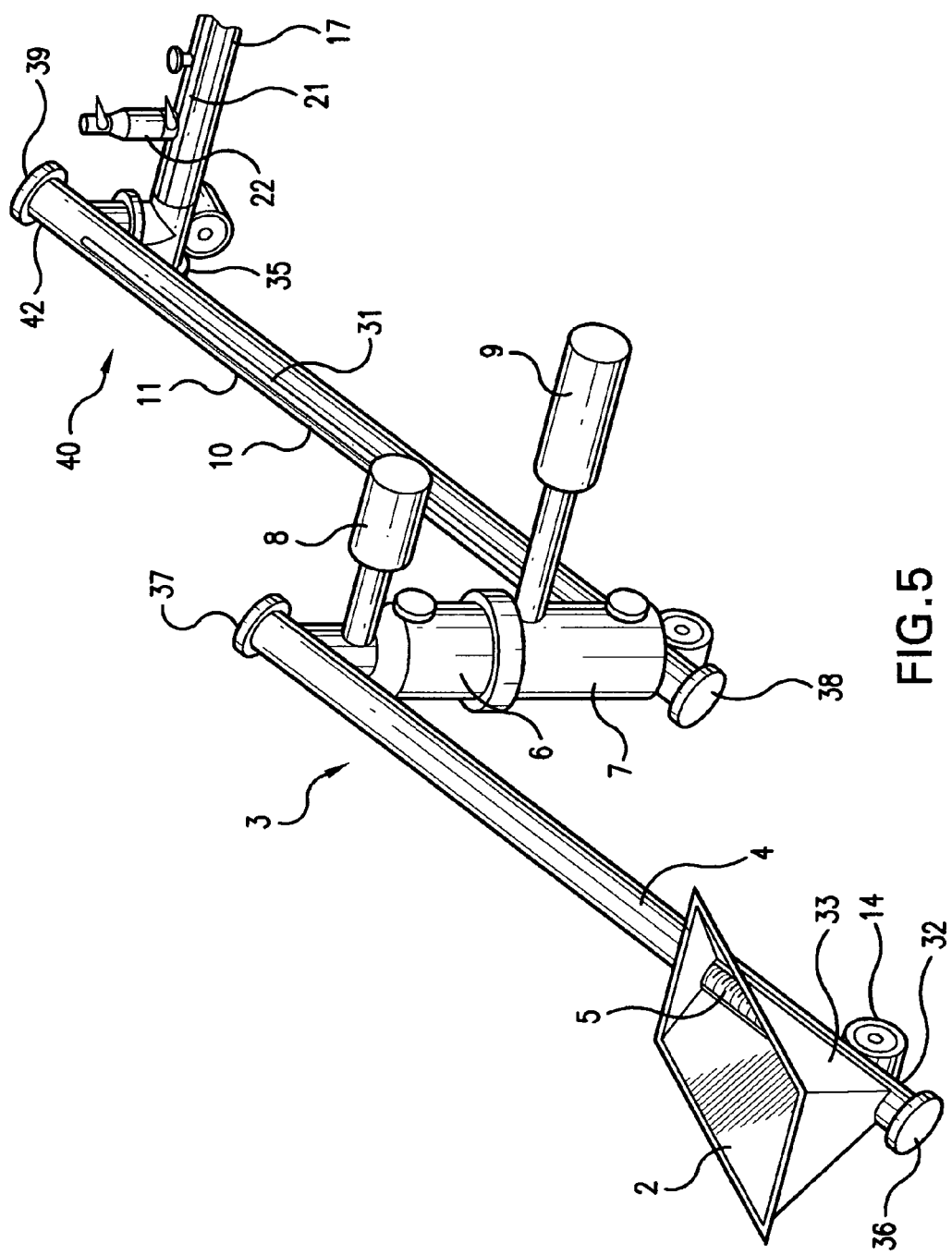
FIG. 5 is a view in perspective of the feeding end of the system.

Turning now to FIG. 5, wherein there is shown a view in perspective of the feeding end of the system showing the feed hopper 2, at the base 32 of the conveyor 3. The feed hopper 2 is constructed such that it will hold water in its base 33. The water is used occasionally to enhance the reaction of the waste products in the reactor 16. For example, if rubber tires are the waste product, then water is used at the rate of from zero to 50% by weight of the tire feed to the feed hopper 2. It is known by the inventors herein that the higher the vacuum, the higher the temperature, and with no water, the conversion is mainly to gases and liquids, while lower vacuum, lower temperature with water usually results in a preponderance of carbon black.

The conveyor 3 is constructed of an elongated hollow tube 4 that contains a rotating screw 5 that collects the waste from the bottom 33 of the feed hopper 2 and moves it up the elongated hollow tube 4 and dumps the waste into the first fill chamber 6. The elongated hollow tube 4 is capped at its base end 32 by a sealed cap 36 and the top end of the elongated hollow tube 4 is also capped and sealed by a cap 37.

The bottom of the feed hopper 2 is open to allow the particles to be picked up by the rotating screw 5 and moved to the first fill chamber 6, along with whatever water the particles pick up while resident in the feed hopper 2. The rotatable screw 5 is powered and driven by a motor 14, and preferred for this invention is a rate of rotation that will back fill the first fill chamber 6 and the second fill chamber 7 such that the feed can be moved by the metering system at the rate of up to 10,000 pounds of waste per hour of operation. If tires are used by way of example, the tire particles or chips should have a size that is 2 inches square or less, and smaller particles are preferred, it being noted that shredded tires do not have a thickness much beyond about ½ inch. Particles having a size smaller than 2 inches square enhances the reactivity of the particles when they enter the reactor 16. This system is also useful for wastes such as plastics, carpet, wood chips, and other bio waste.

Surmounted on the top of the first fill chamber 6 is a first control valve 8 that is closed initially. The first fill chamber 8 is surmounted on a second fill chamber 7, and surmounted on the second fill chamber 7, and between the two chambers, is a second control valve 9. In operation, the first control valve 8 is open, and the second control valve 9 is closed, and a vacuum is applied to the system from the distal end 30 of the reactor 16. With continuous application of negative pressure, the first fill chamber 6 is filled with a predetermined amount of waste material and the first control valve 8 is then closed. The second control valve 9 is then opened and the waste material is allowed to flow into the second fill chamber, and then the second control valve 9 is closed.

The first fill chamber 6 can contain a vibrating level indicator (not shown) that levels the materials that is fed to the first fill chamber 6. This vibrating level indicator is positioned in the first fill chamber 6 at an angle of from zero to 45° from the vertical such that depending on the waste material, the waste material is leveled in the chamber by the vibration before it is moved into the second fill chamber 7. The vibrating level indicator can have a high and a low level indicator as well.

The feed is picked up by a rotating screw 12 (FIG. 3) and the rotating screw 12 is moved up through the elongated hollow tube 10 (FIG. 3) of the metering means 40 to eventually empty into the reactor 16 at the near end 34 of the reactor 16. The elongated hollow tube 10 is capped and sealed at its base by a cap 38 and at its top by a cap 39.

Figure 4:
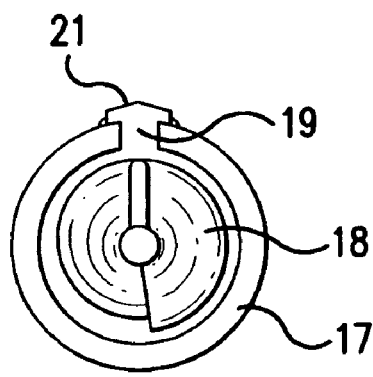
FIG. 4 is a cross sectional end view of the reactor through line C-C of FIG. 1.

Unlike the conveyor elongated hollow tube 4, the elongated hollow tube 10 of the metering means 40 has an elongated opening 13 in the top side 11 (FIG. 3) that is capped and sealed with a vaulted, sealed covering 31. Generally, since the material of construction for the elongated hollow tubes is steel, the vaulted, sealed covering 31 is welded to the top side 11 as is shown in FIG. 4 as 41. However, any means of sealing this covering to the elongated hollow tube is acceptable.

The purpose of the vaulted covering 31 is to allow for the waste material to be moved along in the elongated hollow tube 10 without binding on the rotatable screw 12 and jamming the rotatable screw 12.

When the waste material reaches the top 42 of the elongated hollow tube, it falls by gravity into the near end of the elongated hollow tube 17 of the reactor 16 where it is picked up by a rotatable screw 18 (FIG. 4).

Prior to the emptying of the waste material into the reactor 16, the reactor 16 is subjected to the catalyst for the reaction. This is accomplished by mounting a catalyst feed vessel 22 near the near end 42 of the elongated hollow tube 17. The catalyst feed vessel 22 opens directly into the reactor 16 and the catalyst loading is controlled by the control valves 25 and 26. The reactor is heated to at least a temperature of 300° F. and preferred for this invention, the reactor 16 is preheated to about 800° F. The upper control valve 25 is then opened and the bottom control valve 26 is closed. A predetermined amount of catalyst is loaded into the catalyst feed vessel 22 and the top valve 25 is closed and the bottom control valve 26 is opened. The catalyst feeds by gravity, but is assisted by the negative pressure that is drawn on the reactor 16.

This aspect of the invention is very important, as the catalyst must be added to the preheated reactor 16 before any of the waste material is fed into the reactor 16. In this manner, it is believed that the catalyst, as a very fine powder, coats the interior surface of the elongated hollow tube 17 and also the surfaces of the rotating screw 18.

If the catalyst is added in this fashion, it maintains as a coat on the interior surface of the reactor 16 and the rotatable screw 18 and be available for all additional waste material that is fed into the reactor. If the catalyst is added in this manner, according to this invention, then no additional catalyst has to be added to the reactor 16 for additional batches of waste material fed to the reactor 16. As long as the temperature of the reactor 16 is maintained in excess of 300° F., batch after batch of waste material can be added to the reactor 16 without having to add additional catalyst. This is a novel feature of this invention. If the temperature drops below about 300° F., then the catalyst must be renewed for any additional waste material fed to the reactor and it must be carried out according to the protocol set forth above for the invention.

After the catalyst has been added, the waste material from 40 is added to the reactor 16 and the rotating screw moves the waste material along the elongated hollow tube 17 as it reacts and converts to the desirable products.

Figure 6:
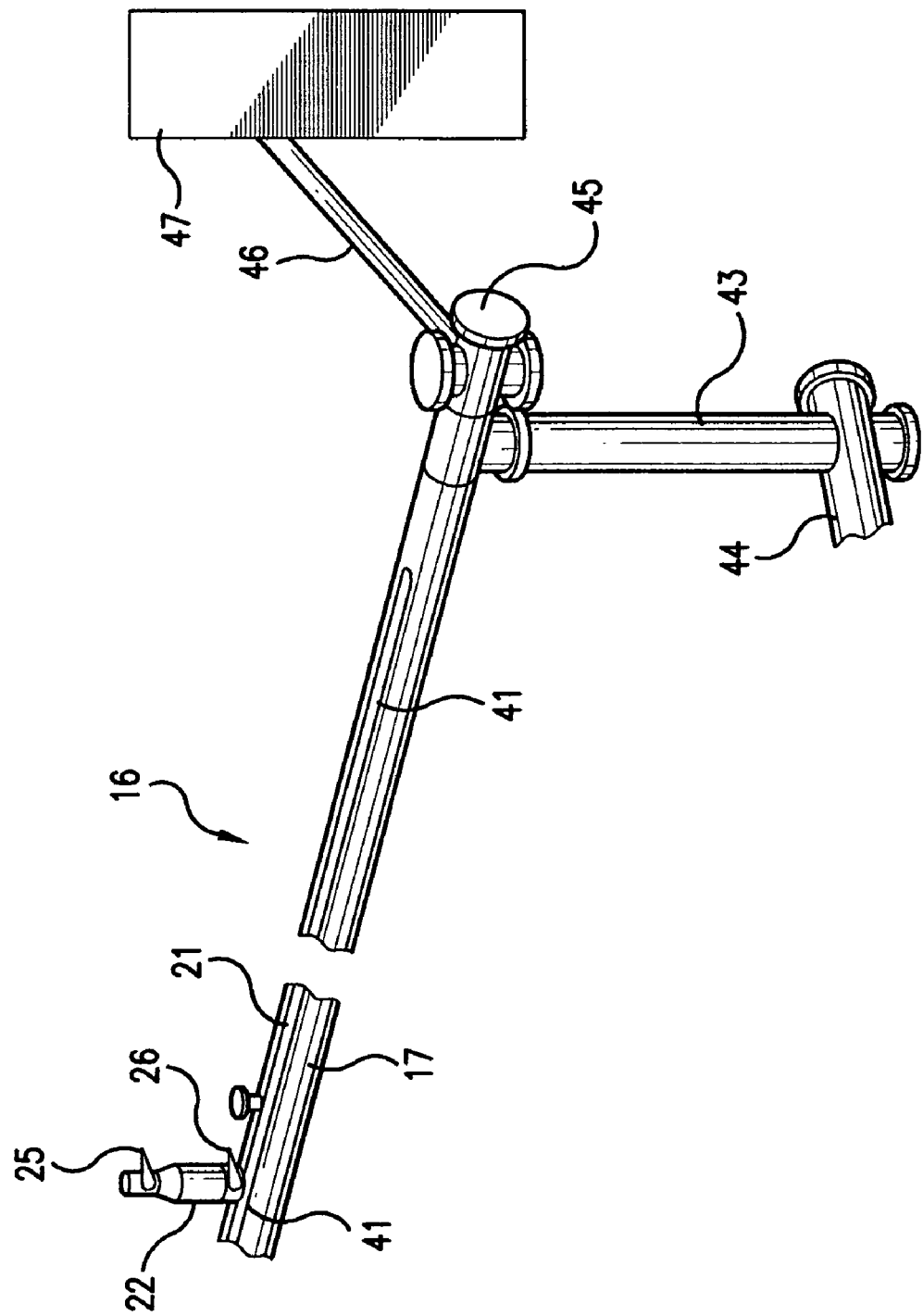
FIG. 6 is a view in perspective of the exiting end of the system.

With reference to FIG. 6, which is an enlarged view of the distal ½ of the reactor 16, with the catalyst feed vessel 22 noted for purposes of aligning the Figure with that of FIG. 5, it will be noted that the elongated hollow tube 17 has a vaulted, sealed covering 21 and that it is sealed by welds 41. The purpose of this vaulted, sealed covering 21 is the same as for that in the metering means 40 and in addition, it is a means of preventing the rotatable screw 18 from scraping the catalyst from the interior surface of the elongated hollow tube 17.

The elongated hollow tube 17 is heated for its entire length and maintained in the range of about 400° F. and 1600° F. for the duration of the operation. Also, the second fill chamber 7, the metering means 40, and the reactor 16 must all be under negative pressure. For purposes of this invention, the negative pressure can range from about 0.5 mm Hg to about 26 mm Hg, and the preferred ranges is from about 19 to 22 mm Hg. The system of this invention can be equipped with standard equipment such as temperature indictors, pressure indicators, load quantity indicators, and the like. Likewise, this system can be equipped and monitored using computers for feeding, conveying heating, non-pressuring and pressuring, and the like.

The pitch of the rotatable screws in this system have a pitch of from 6 to 12 inches per linear foot and preferred is 8 to 10 inches per linear foot and most preferred is 8 inches per linear foot.

The reactor 16 is provided with a heating means that is preferred to be electric band heaters. Also useful are heating mantles that are configured to the outside surface of the reactor 16. The reactor 16 can also be provided with a cooling means which can be for example, cooling coils around the outside surface of the reactor, or the cooling can be internal cooling, such as through the rotatable screws, or it can be a combination of them. The heating system can also be by way of natural gas or some other similar means. The total length of the reactor 16 depends on the throughput desired in the system.

During the movement of the reacting materials from the near end 42 of the reactor 16 to the distal end of the reactor 30, the materials breakdown into various substituents ranging from volatile gases to oils, to organic compounds, to solids comprised mainly of carbon black. At the distal end 30 of the reactor, the solids are separated from the mainstream by gravity and drop down a hollow tube 43 into a solids conveyor 44.

The volatile gases, and liquids from the reaction are conveyed out of the reactor via an exit port 45 and conveyance line 46 to a gas and liquid collection station 47. The gas and liquid collection station is composed of compressors, pipelines and various other equipment to collect and separate the gases and liquids and convey them to various storage facilities. All of such equipment is known in the art and is standard in the industry and is not shown in detail herein.

Figure 7:
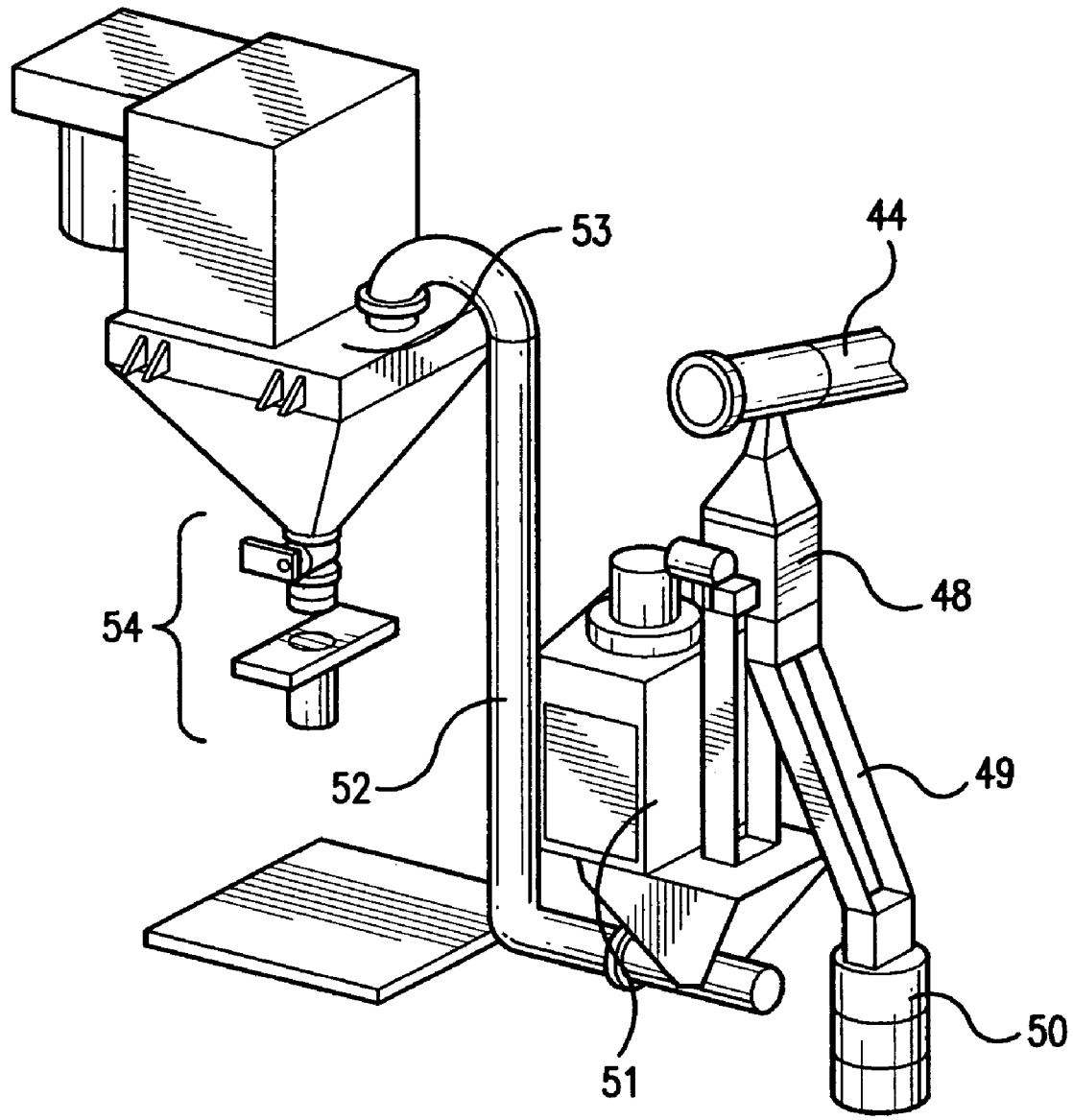
FIG. 7 is a view in perspective of the solids collection means.

The solids collection system is essentially known in the art and is standard in the industry. Turning to FIG. 7, which is an enlarged version of the solids collection system of the invention, it consists of the solids conveyor 44 from the reactor 16 (not shown) to a magnetic separator 48 where any magnetically attracted metal is extracted and funneled by a chute 49 into a collection bin 50. The solids are then moved to a collection bin 51 and a pneumatic conveyor 52 propels the solids to a storage bin 53. From there, the solids are bagged or boxed through the means 54.

The catalysts for this process are alumino silicates in their various forms such as mullites, zeolites, montmorillonites, and the like.

The carbon black produced by this process is novel in that it is carbon black with a small amount of material on the surface that gives the carbon black some unusual properties.

What is claimed is:

1. A process for obtaining carbon-based products from hydrocarbons, the process comprising:
   (A) providing a feed hopper; a feed conveyor having an elongated hollow housing having an elongated opening therein that is surmounted by a vaulted, sealed covering; a first fill chamber with a first control valve in an open position; a second fill chamber with a second control valve in a closed position; a metering means having an elongated hollow housing having an elongated opening therein that is surmounted by a vaulted, sealed covering; a reactor comprising an elongated hollow housing having an elongated opening therein that is surmounted by a vaulted, sealed covering, a rotatable screw, an entry port and an exit port; a catalyst feed vessel having an upper control valve in an open position and a lower control valve in a closed position; a solids collection means; a gas and liquid collection means; a means of providing a negative pressure for the second fill chamber, the metering means, the catalyst feed vessel, and the reactor; and a means of heating the second fill chamber, the metering means, the catalyst feed vessel, and the reactor;
   (B) feeding a predetermined amount of hydrocarbons into the feed hopper;
   (C) providing a negative pressure on the second fill chamber, the metering means, the catalyst feed vessel and the reactor by the use of the means of providing a negative pressure;
   (D) feeding a predetermined amount of hydrocarbons from the feed hopper into the first fill chamber by the use of the feed conveyor and closing the first control valve;
   (E) opening the second control valve and allowing the contents of the first fill chamber to enter into the second fill chamber and closing the second control valve;
   (F) heating the reactor using the means of heating;
   (G) introducing a predetermined amount of catalyst into the catalyst feed vessel and closing the upper control valve;
   (H) opening the lower control valve of the catalyst feed vessel and allowing the catalyst to enter the heated reactor;
   (I) metering the contents of the second fill chamber into the entry port of the catalyst containing heated reactor by the use of the metering means and allowing the contents to move through the reactor at a predetermined rate by the use of the rotatable screw, wherein the hydrocarbons react under the influence of the catalyst and provide volatile and solid carbon-based products; and
   (J) allowing the solid carbon-based products to separate and move from the volatile carbon-based products by gravity to the solids collection means through the exit port of the reactor, and allowing the volatile carbon-based products to move to the gas and liquid collection means through the exit port of the reactor.

2. The process as claimed in claim 1 wherein the hydrocarbons are continuously fed to the reactor, and the temperature in the reactor does not decrease below about 300° F.

3. The process as claimed in claim 1 wherein there is additionally water present in the feed hopper and the amount of water is up to 50% by weight based on the weight of the water and the hydrocarbons.

4. The process as claimed in claim 1 wherein the temperature for the process is in the range of 300° F. to 1600° F.

5. The process as claimed in claim 1 wherein the temperature for the process is in the range of 800° F. to 1200° F.

6. The process as claimed in claim 1 wherein the catalyst is selected from the group consisting of mullites, zeolites, and montmorillinite.

7. The process as claimed in claim 6 wherein the catalyst is aluminosilicate.

8. The process as claimed in claim 7 wherein the aluminosilicate is zeolite.

9. The process as claimed in claim 1 wherein the hydrocarbons are particulate tire material.

10. The process as claimed in claim 9 wherein the particulates are 2 inches or less in size.

11. The process as claimed in claim 1 wherein the hydrocarbons are waste hydrocarbons.

* * * * *